Oct. 15, 1940.     W. BURROWS     2,218,278
TUBULAR WIRE STRANDING MACHINE
Filed Feb. 16, 1940
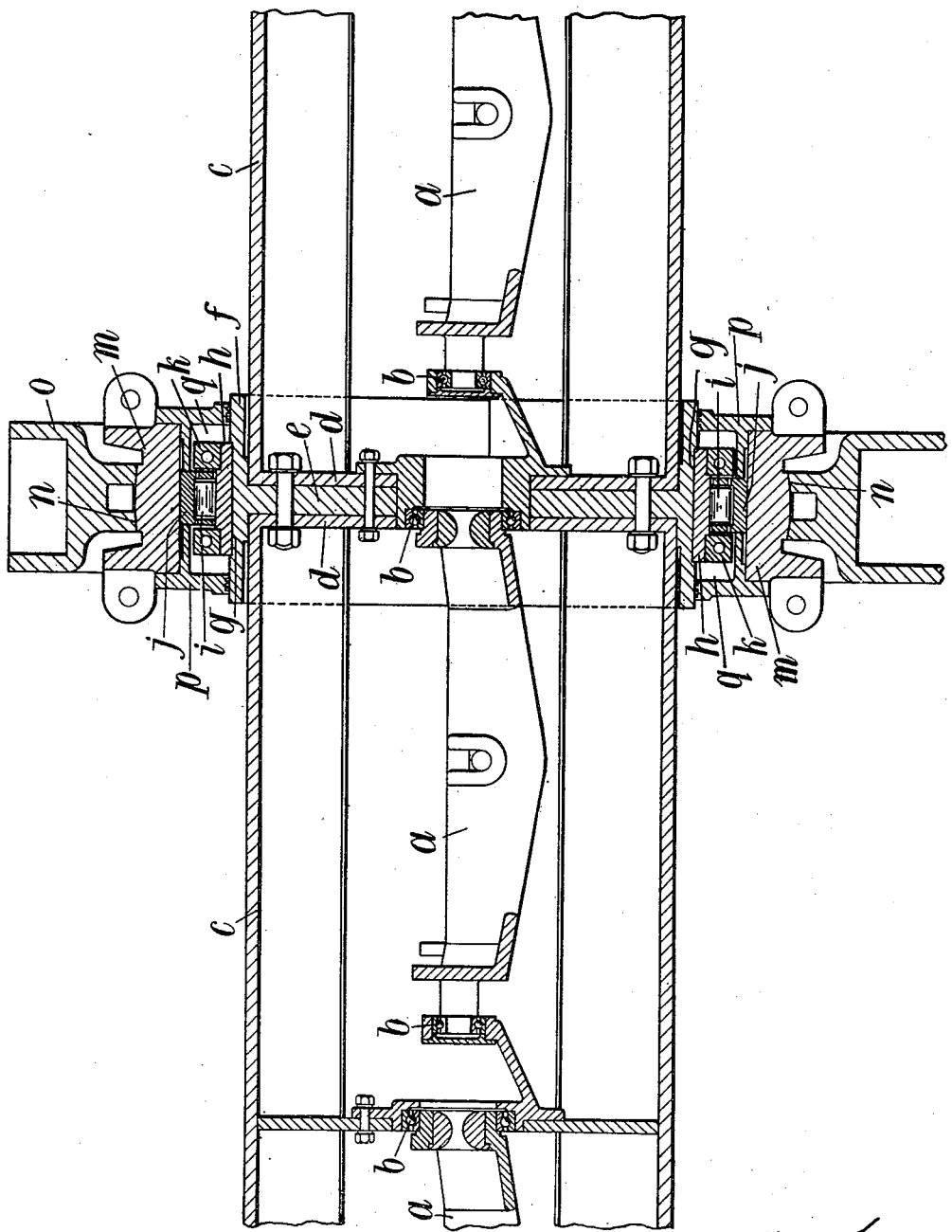
Inventor,
W. Burrows
By: Glascock Downing & Seebold
Attys.

Patented Oct. 15, 1940

2,218,278

UNITED STATES PATENT OFFICE 2,218,278

TUBULAR WIRE STRANDING MACHINE

William Burrows, Warrington, England, assignor to Hanson & Edwards Limited, Warrington, England, a company of Great Britain Application February 16, 1940, Serial No. 319,345
In Great Britain January 7, 1939

2 Claims. (Cl. 57—59)

REISSUED
NOV 11 1941

This invention relates to wire stranding machines of the high speed tubular type in which the wire reels are mounted within a revolving tube built up from a plurality of sections, and has for its object to provide improved bearings for the said tube which can be readily and conveniently assembled.

The invention comprises a roller bearing assembly for the revolving tube of a wire stranding machine of the type specified, comprising an intermediate runner ring which surrounds the adjacent ends of two sections of the revolving tube which are secured to such ring.

The invention further comprises in or for a wire stranding machine of the type specified, a bearing assembly comprising an intermediate runner ring carrying the inner race of a roller bearing and having an internal rib coming between or adapted to come between the ends of adjacent sections of the revolving tube and secured or adapted to be secured thereto, and an outer ring carrying the outer race of the said roller bearing and secured or adapted to be secured in the machine frame or housing.

Preferably there are side members upon said outer or inner ring which provide an oil or grease retaining space between themselves, the outer ring and the said roller bearing.

The rollers are preferably capable of axial movement upon the inner or outer race to allow for the expansion and contraction of the revolving tube.

In the case of tubular wire stranding machines in which the tube sections are of the plain or butt ended instead of flanged ended kind, the ends of the tube sections may be secured to the parts of the intermediate runner ring into which they fit by countersunk set screws or by bolts, instead of being secured to an internal rib upon such ring.

It is to be understood that the tube is of uniform diameter throughout, the intermediate runner ring having an internal diameter corresponding to the full external diameter of the tube.

The accompanying explanatory drawing is a longitudinal sectional elevation through part of one wire stranding machine constructed in accordance with the present invention.

The wire reels, not shown, are mounted in a series of cradles $a$ carried on ball bearings $b$ in a rotary tube $c$.

The tube $c$ is of uniform diameter throughout and is made in sections, the adjacent ends of which are inwardly flanged as at $d$ and bolted to an internal rib $e$ on an intermediate runner ring $f$ (which fits over the ends of the tube sections) and to one another.

This runner ring $f$ has a recess $g$ around its outer peripheral face in which is received the split inner race $h$ of a roller bearing. The rollers $i$ of this bearing are received in a recess in an outer race $j$ which is retained in position by cage rings $k$ mounted on the said inner race. The said outer race $j$ (which is not split) is supported by a ring $m$ having a spherical mounting (at $n$) in the machine frame $o$. The said outer race $k$ is held in position by two side members $p$ upon the ring $m$, providing between them an oil or grease retaining space $q$. The ends of these side members $p$ engage the intermediate runner ring $f$.

The parts $f$, $h$ and $k$ have an axial sliding movement relatively to the parts $i$, $j$, $m$, $p$, to allow for changes in the length of the tube $c$ owing to expansion and contraction thereof, the extent of this sliding movement being limited by engagement of the parts $j$ and $k$. The spherical bearing $n$ compensates for inaccuracies in the alignment of the tube $c$ relatively to the machine frame.

The complete bearing structure, from the intermediate ring $f$ to the outer ring $m$, can be sent out from the makers' factory ready assembled, and when the machine is set up the sections of the tube $c$ are simply bolted together with the bearing assemblies in position between adjacent sections. Thus slight distortions in the tube or inaccuracies in its alignment do not disturb the bearing assembly.

What I claim is:

1. A roller bearing assembly for the revolving tube of a wire stranding machine of the type specified, comprising a revolving tube of uniform diameter throughout its length, a ring intermediate adjacent sections of said revolving tube which surrounds the ends of said sections and is secured thereto, and a roller bearing surrounding said ring.

2. In or for a wire stranding machine of the type specified, a revolving tube of uniform diameter throughout its length, a bearing assembly comprising a ring adapted to embrace the exterior surfaces of the ends of adjacent sections of the said revolving tube, an internal rib upon said ring adapted to come between the ends of said sections, means to secure said ring to said sections, a roller bearing disposed around said ring, and an outer ring surrounding said roller bearing and adapted to be secured to a fixed support.

WILLIAM BURROWS.